United States Patent [19]

Wüst

[11] Patent Number: 4,823,767
[45] Date of Patent: Apr. 25, 1989

[54] APPARATUS FOR STEAMING FOOD

[76] Inventor: E. Wüst, Kamorastrasse 4, CH-9030 Abtwil, Switzerland

[21] Appl. No.: 913,667
[22] PCT Filed: Jan. 20, 1986
[86] PCT No.: PCT/CH86/00007
§ 371 Date: Nov. 4, 1986
§ 102(e) Date: Nov. 4, 1986
[87] PCT Pub. No.: WO86/04221
PCT Pub. Date: Jul. 31, 1986

[30] Foreign Application Priority Data

Jan. 21, 1985 [CH] Switzerland ............................ 253/85
Jun. 24, 1985 [EP] European Pat. Off. ......... 85810290.8

[51] Int. Cl.[4] .............................................. A21B 1/00
[52] U.S. Cl. ..................... 126/20; 219/401; 219/275; 219/271; 122/401; 122/451 S; 122/451.1; 122/479 S; 126/374; 126/377; 126/378; 126/388; 99/467
[58] Field of Search .................. 126/369, 369.1, 369.2, 126/374, 377, 378, 379, 388, 20, 348; 219/395, , 397, 400, 401, 271, 272, 275; 122/1 C, 1 B, 401, 451 S, 451.1, 479.5, 505, 489, 499; 99/467

[56] References Cited

U.S. PATENT DOCUMENTS

| 65,823 | 6/1867 | Millar | 126/377 |
| 258,359 | 5/1882 | Bowne | 126/377 |
| 338,583 | 3/1886 | Burkhard | 126/377 X |
| 1,129,561 | 2/1915 | Duggan | 122/505 |
| 1,343,644 | 6/1920 | Richardson | 126/378 |
| 1,955,289 | 4/1934 | Greenheld | 126/369.1 |
| 2,007,034 | 7/1935 | Bidwell | 219/272 X |
| 2,317,441 | 4/1943 | Chause | 126/378 X |
| 2,495,603 | 1/1950 | Ryan | 126/374 |
| 2,569,958 | 10/1951 | Struve et al. | 126/373 X |
| 2,750,937 | 6/1956 | Sjolund | 126/369.2 |
| 2,885,294 | 5/1959 | Larson et al. | 126/369 |
| 3,111,574 | 11/1963 | Spini | 126/378 X |
| 3,321,136 | 5/1967 | Trevillian et al. | 126/378 |
| 3,500,818 | 3/1970 | Elias | 126/369 |
| 3,623,421 | 11/1971 | Schwartz et al. | 126/369 |
| 3,814,901 | 6/1974 | Morhack | 126/369 |
| 4,173,215 | 11/1979 | Bureau et al. | 219/401 X |
| 4,197,819 | 4/1980 | Mahoney et al. | 219/275 X |
| 4,230,577 | 10/1980 | Bennecke et al. | 122/401 X |
| 4,281,636 | 8/1981 | Vegh et al. | 126/369 |
| 4,617,908 | 10/1986 | Miller et al. | 126/369 |
| 4,684,787 | 8/1987 | Bunting | 219/400 |

FOREIGN PATENT DOCUMENTS

| 84004 | 11/1895 | Fed. Rep. of Germany | 126/378 |
| 1243302 | 12/1958 | France | 126/348 |
| 2201747 | 4/1974 | France | 126/369.1 |
| 2491595 | 4/1982 | France | 219/401 |
| 0832247 | 5/1981 | U.S.S.R. | 219/275 |

OTHER PUBLICATIONS

WO 83/01101 (Int. Application), Cl. 122/489, HEIEN, 3/1983.

Primary Examiner—Samuel Scott
Assistant Examiner—Carl D. Price
Attorney, Agent, or Firm—Berman, Aisenberg & Platt

[57] ABSTRACT

The steamer comprises a first heating chamber (5) intended to generate wet steam from supplied water, and a second heating chamber (6) arranged between the first heating chamber (5) and the cooking chamber (2) and used for heating the wet steam coming from the first heating chamber (5). The temperature of the steam introduced in the cooking chamber (2) by means of the distribution means (4) is regulated by control device (9). In the steamer, the temperature of the steam supplied to the cooking chamber (2) may be continuously varied while reducing to a minimum the negative influence of limestone.

17 Claims, 3 Drawing Sheets

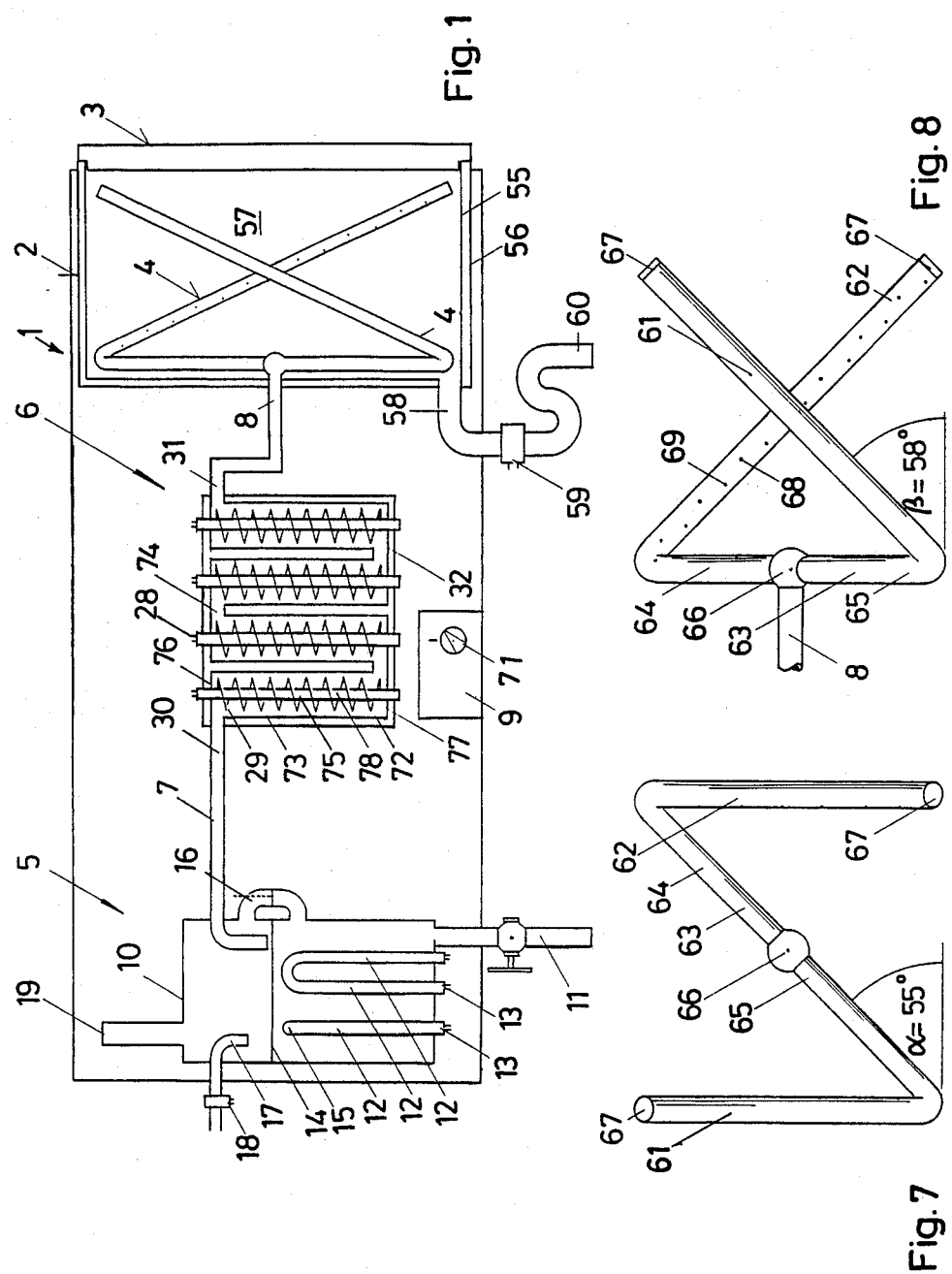

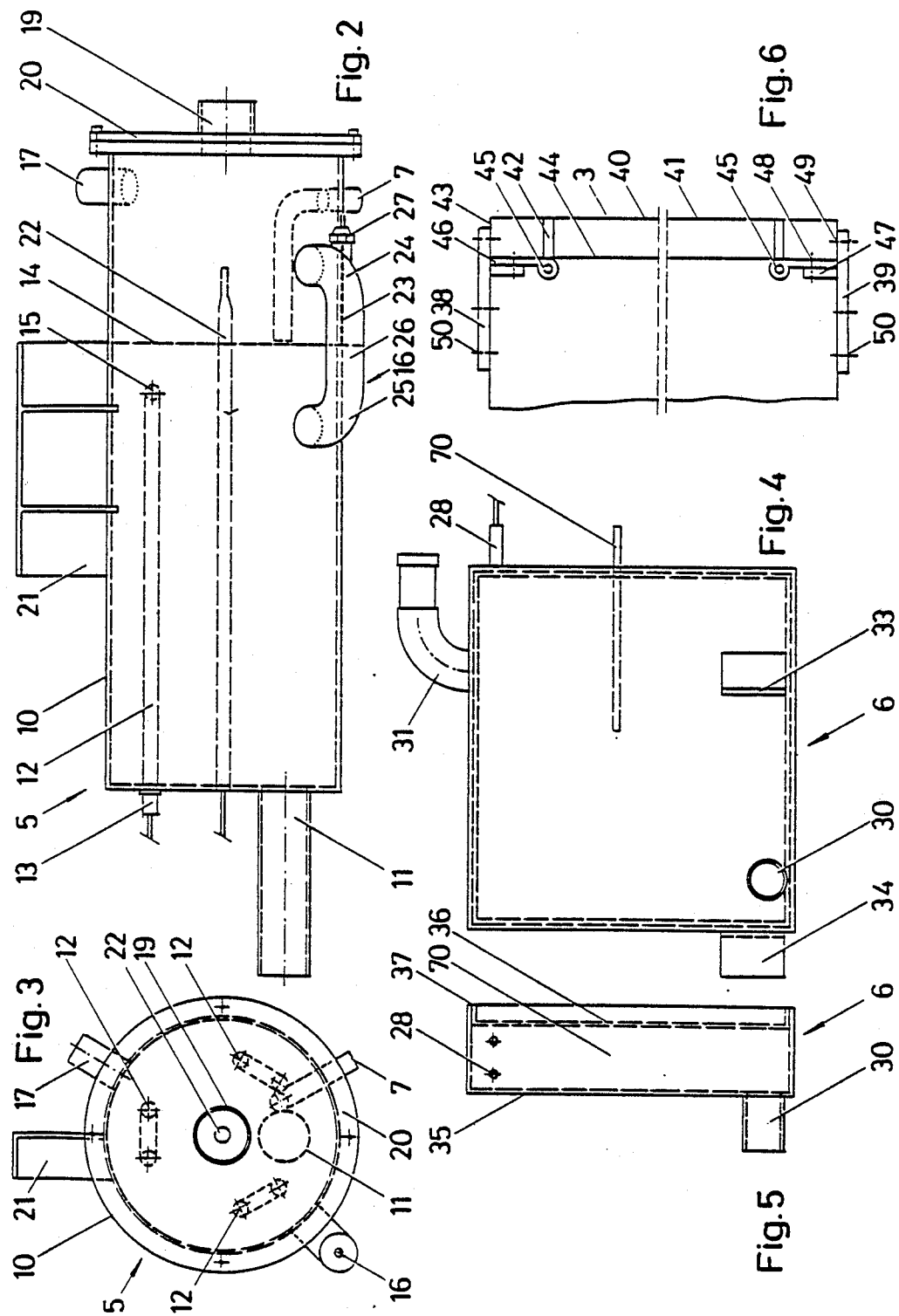

APPARATUS FOR STEAMING FOOD

FIELD OF THE INVENTION

Background

The present invention relates to a steamer. Steamers are appliances making it possible to defrost and/or heat and/or cook food by means of steam. Steamcooked food has more vitamins, a higher nutritional value, natural colors, its own particular aroma, etc. This is not the case when food is prepared in another way.

One of the steamers already known contains a double-walled cooking space, the inner side walls of such a cooking space each being equipped with two vertically extending rows of nozzles. Arranged under the cooking space is a water bath, in which heating elements are located and in which steam is generated from tap water. The steam first passes into the cavity limited by the two walls of the cooking space, and from there steam flows through the said nozzles into the cooking space. The cooking space is provided with an orifice, through which the steam cooled by the cooking food and condensation water is able to leave the cooking space. The known steamer is also equipped with a control device which makes it possible to set the cooking times required and which allows the individual parts of such a steamer to interact with one another.

This known steamer has two essential disadvantages. it generates steam at a constant temperature, so that for relatively large quantities of cooking food the treatment time has to be extended correspondingly. Limestone is deposited in the steam generator, thus causing disturbances in the operation of this known steamer.

SUMMARY OF THE INVENTION

The object of the present invention is to provide a steamer which does not have the disadvantages mentioned.

According to the invention, this object is achieved in the way defined in the characterizing clause of claim 1.

Exemplary embodiments of the present invention are explained in detail below with reference to the attached drawings.

BRIEF DESCRIPTION OF THE DRAWINGS

FIG. 1 shows the present steamer diagrammatically,

FIG. 2 shows a side view of a first heater of the steamer according to FIG. 1, this heater being shown horizontal in the drawing for reasons of space.

FIG. 3 shows a plan view of the heater according to FIG. 2,

FIG. 4 shows a side view of a second heater of the steamer according to FIG. 1,

FIG. 5 shows a front view of the heater according to FIG. 4,

FIG. 6 shows a side view of the door of the steamer according to FIG. 1,

FIG. 7 shows a front view of a steam distribution means accommodated in the cooking space of the steamer according to FIG. 1, FIG. 8 shows a side view of the distribution means according to FIG. 7.

DETAILS

Figures 9, 11:
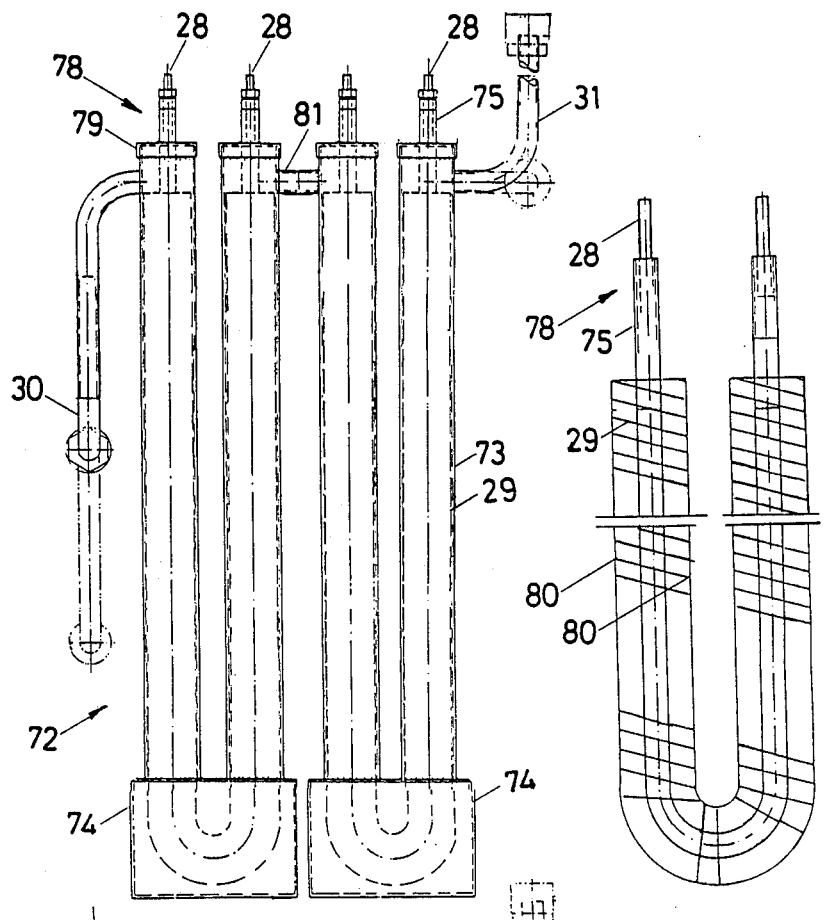
FIG. 9 shows a side view of another design of the second heater.
FIG. 11 shows a U-shaped heating element, together with helical ribs attached to it, of the second heater.

The steamer illustrated in FIG. 1 has a housing 1, in which is accommodated a container 2 intended for receiving the food to be treated (not shown). This container 2, also designated as a cooking space, can be closed at the front by means of a door 3. A steam distribution means 4 is arranged in the cooking space 2. The middle portion of the distribution means 4 is fastened in the region of the rear wall of the container 2. Also located inside the housing 1 of the present steamer is a first heater 5 which is intended for generating wet steam from tap water. Connected to this first heater 5 via a connecting pipe 7 is a second heater 6 which serves for heating steam emerging from the first heater 5. The second heater 6 is connected via a second connecting pipe 8 to the distribution means 4 and consequently also to the cooking space 2. The steamer also has an electronic control device 9 which controls the interaction of the individual parts of the steamer according to predetermined programs and which is shown merely diagrammatically in FIG. 1.

As is evident from FIG. 1, the first heater 5 has an essentially cylindrical boiler 10, the axis of this boiler extending vertically. For reasons of space, the boiler 10 is shown horizontal in FIG. 2. The lower portion of the boiler 10 is equipped with an outlet 11 which can be closed in a controlled way and the purpose of which will be described further here. Arranged in the lower region of the boiler 10 are bar-shaped electrical heating elements 12 arranged vertically and standing approximately parallel to one another. The lower end 13 of the heating elements 12, which is located outside the boiler 10, is designed as a connection point 13 for wires (not shown) which supply heating elements 12 with electrical energy. FIG. 3 shows that the heating elements 12 are essentially U-shaped, and the ends of the legs of such heating elements 12 are fastened in the bottom of the boiler and carry the said connections 13. During the operation of the steamer, the water level 14 in the boiler 10 must be above the top ends 15 of the heating elements 12. This is ensured by means of an electronic level meter, the sensor 16 of which is attached to the boiler 10.

In the upper portion, the casing of the boiler 10 has a cold-water connection 17 with an electronically controlled valve 18 and a connection point for the first connecting pipe 7 already mentioned. At the top, there is also a socket 19 for introducing a deliming substance, this socket 19 being formed on the cover 20 of the boiler 10 which is screwed to the boiler casing. The boiler casing is equipped with a bracket 21 which makes it possible to fasten the boiler 10 in a vertical position inside the steamer housing 1. A temperature sensor 22 extending through the boiler 10 is fastened in the bottom of the boiler 10 and is connected to the said control device 9 in the same way as a probe 23 in the sensor 16 of the level meter.

The sensor 16 of the level meter contains an approximately U-shaped tube connected in flow terms to the casing of the boiler 10, so that water can also flow into the level meter tube 16. The level meter tube is composed of two curved legs 24 and 25 connected at one end to the boiler casing, and of a straight tubular piece or web 26 connecting the legs 24 and 25. The above-mentioned probe 23 of the level meter, which is connected to the electronic part of the level meter located in the control device 9, is essentially barshaped, its longitudinal axis is approximately parallel to the longitudinal axis of the boiler 10, and it passes through the upper leg 24 of the U-shaped tube of the sensor 16. FIG. 2 also shows a screw connection 27, by means of which the probe 23 is held in a vertical position in the leg 24 of the tube 16.

The second heater 6 (FIG. 4 and 5) has a tuboid housing which is equipped with a first socket 30 for connecting the feed pipe 7 from the first heater 5 and with a second socket 31 for connecting the pipe 8 leading to the cooking space 2. Arranged inside the second heater 6 is a heating element 32 (FIG. 1), of which only its electrical connections 28 are shown in FIG. 4 and 5. The heating element 32 has a meander-shaped casing 72 for the steam to be heated. The start and end of this casing 72 is connected to the sockets 30 and 31.

The casing 72 broken at right angles contains longer parallel portions 73 and shorter parallel portions 74, these last portions 74 serving as connecting channels for the longer portions 73, in which steam is heated. Tubes 75 extend through the longer portions 73 of the casing 72 and are fastened in an air-tight manner in the end walls 76 and 77 of these portions 73. The surface of the tubes 75 which is located inside the longer portions 73 is provided with an all-round rib 29, for example made of sheet metal, which enlarges the surface of the tubes 75 in a known way. Arranged in the tubes 75 are electrical approximately cylindrical heating elements 78, the electrical connections 28 of which project from the casing 72 on both sides. These connections 28 are connected electrically to one another inside the heater housing and are then connected to a common electrical supply source. Steam passes through the inflow socket 30 into the casing 72, where it is forced to flow along the ribs 29 heated by the heating elements 78. The temperature of the steam thereby increases, and the steam heated to the desired temperature then leaves the second heater 6 through the outflow socket 31.

The housing of this heater 6 is equipped with brackets 33 and 34 which make it possible to fasten the housing of this heater 6 in the steamer housing 1. Advantageously, the heater housing has a hollow main part 35 (FIG. 5), into which a cover 36 is inserted, the edges 37 of these two parts being connected to one another, for example by means of welding. The second heater 6 is likewise equipped with a temperature sensor 70 which supplies information on the temperature of the steam contained in it to the control device 9.

FIG. 6 only shows that part of the housing 1 of the steamer, to which the door 3 is connected in a known way via hinges 38 and 39. The door 3 has a dish-shaped main part 40. From the bottom 41 of this main part 40 project spacer pieces 42 which are distributed along the side walls 43 of the main part 40. The free ends of the spacer pieces 42 are provided with thread bores, and on these end portions of the spacer pieces 42 rests a plate-shaped inner cladding 44 of the door 3. By means of screws (not shown), this inner cladding 44 is connected to the spacer pieces 42. The edge portion of the inner cladding 44 is provided with a series of bores, and an all-round bead-shaped seal 45 rests by means of its flat part 46 on this edge portion. A frame 47 is arranged on the flat part 46. By means of screws 48, the seal 45 is clamped between the frame 47 and the edge of the inner cladding 44 and is thus held in place. The upper and lower side walls 43 of the main part 40 of the door are connected rotatably to the hinge plates 38 and 39 by means of pins 49. These plates 38 and 39 are connected to the steamer housing 1 by means of screws 50. The door 3 can be equipped with a known door handle.

The casing of the cooking space 2 consists of two walls 55 and 56 which are intended to ensure as good heat insulation of the interior 57 of the cooker as possible. Connected to the container 2 in the region of the rear wall, at the bottom and in the center, is a flow-off pipe 58 which is equipped with an electronically controlled valve 59 and with an odor trap 60. At the front, the cooking space 2 can be closed by means of the door 3 already described.

Arranged in the interior 57 of the cooking space 2 is the above-described distribution means 4 for the steam supplied through the pipe 8. This means 4 designed essentially as a tube is approximately U-shaped, so that it has two legs 61 and 62 which are connected to one another by means of a web 63. The web 63 consists of two portions 64 and 65 which are connected by means of a T-piece 66. The feed pipe 8 is connected to the middle part of the T-piece 66. The web 63 of the distribution means 4 is located near the rear wall of the cooking space 2, and its longitudinal axis forms an angle alpha of approximately 55 degrees (FIG. 7) with the horizontal. The web 63 is made long enough to ensure that the elbows at the ends of the web 63 where the latter adjoins the legs 61 and 62 are located respectively in the floor and ceiling regions of the cooking space 2. The legs 61 and 62 are assigned to the side walls of the cooking space 2, and they form an angle beta of approximately 58 degrees with the horizontal. As seen from the end face, the legs 61 and 62 are bent out of the plane of the U-shape in opposite directions. The legs 61 and 62 extend diagonally along the side walls of the cooking space 2. The size of the said angles alpha and beta depends largely on the dimensions of the cooking space 2. The cooking space can advantageously be designed in standard sizes.

The particular leg 61 or 62, the free end 67 of which is closed, has two rows or sets of orifices 68 and 69, through which steam can flow into the interior 57 of the container 2. These two rows 68 and 69 of orifices extend in the longitudinal direction of the legs 61 and 62. The first set of orifices 68 is arranged in the peripheral direction of the particular leg 61 or 62, in such a way that the steam jets (not shown) issuing from the orifices 68 form an angle of less than 90 degrees with the corresponding side wall of the cooking space 2. As a result of this, these steam jets are directed to a greater extent into the interior of the cooking space 2 and therefore away from the door 3. The row of second orifices 69 is arranged in the particular leg 61 or 62 in the radial direction, so that the steam jets issuing from them an angle with the particular side wall which is less than the angle of the steam jets issuing from the first orifices 68. In addition, the legs 61 and 62 extend diagonally in the interior 57, and the result of this is that an eddy of steam directed towards the mouth of the flow-off pipe 58 in the container 2 is formed in the inteiror 57 of the cooking space. This ensures, by means of a stationary distribution means 4, a swirling of steam assisting the penetration of steam to the individual food constituents. Moreover, this measure reduces the outflow of steam from the cooking space through the door aperture.

The mode of operation of the control device 9 can be changed by means of a regulating member 71 which, in FIG. 1, is represented as a regulating knob on the control device 9. By means of this regulating member 71, the temperature of steam flowing into the cooking space 2 can be changed. This makes it possible, for example, to increase the steam temperature when there are relatively large quantities of food for treatment, so that the treatment time for food is practically independent of its quantity. Furthermore, the control device 9 is designed so that the steam temperature can be adjusted continuously. This makes it possible to obtain a steam-temperature setting matched exactly to the particular quantity and type of food for treatment.

As emerges from the foregoing, steam flowing into the cooking space 2 is generated in two heaters 5 and 6. In the first heater 5, wet steam is formed from tap water or the like. At the same time, limestone which, in the first heater 5, forms layers on the walls of the latter, on the heating elements 12, etc., is precipitated. The steam issuing from the first heater 5 is free of any minerals, so that no limestone deposits can occur in the second heater 6 and thereafter. Thus, in this region of the steamer, nothing can cause the operation of the steamer to be impaired by limestone.

To remove the limestone from the first heater 5, the latter has in its cover 20 the filler socket 19, through which a deliming substance can be introduced into the boiler 10. The water containing limestone and mixed with the deliming substance can be drained off selectively from the boiler 10 through the outlet pipe 11. During the deliming operation, the liquid level 14 in the boiler 10 is advantageously increased. The deliming program can be designed so that the level meter 16 works with a predetermined delay, and so that deliming thereby also takes place in that region located above the operational level 14 of water in the boiler 10. Should it be necessary, for example, to replace the heating elements 12, these are easily accessible after the screwedon cover 20 has been removed.

The heating element 32 in the second heater 6 has a low mass and an enlarged surface. In addition, no deposits of limestone can occur on this, as has already been explained. This makes it possible to change the temperature of the steam present in this second heater 6 without virtually any delay. The steam heating carried out in the second heater 6 also generates in the latter a corresponding pressure which is necessary to obtain the above-mentioned swirling stream in the interior 57 of the cooking space 2.

The two-stage generation of treatment steam makes it possible to change the temperature of the latter. In the first heater 5, steam is generated at a constant temperature of approximtely 95 degrees Celsius. Limestone is thereby precipitated. This steam is then fed to the second heater 6, where the temperature of the heating element 32 can be regulated by means of the control device 9. As a result of the control of this heating element 32, the temperature of the steam flowing into the cooking space 2 can be changed and also set exactly. The technical means which the control device contains for this purpose are known per se. Since no limestone deposits can occur in the second heater 6, it is possible to set the desired steam temperature directly, even during prolonged operation of the steamer. The temperature of the treatment steam can be, for example, in the regionof 190 degrees Celsius.

It goes without saying that the control device 9 makes it possible to actuate not only the valves 18 and 59 illustrated, but also those valves which are not shown in the drawings for the sake of simplicity.

Figure 10:
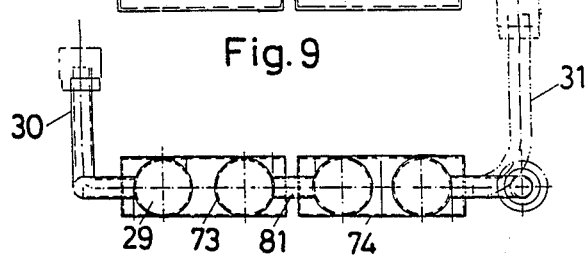
FIG. 10 shows a bottom view of the heater according to FIG. 9.

FIG. 9 to 11 illustrate a further embodiment of the second heater 6, in which the heating elements 78 are made U-shaped. The casing 72 of this heater 6 (FIG. 1) contains the longer portions 73 which are designed as tubular portions and each of which surrounds one leg of the heating element 78. The first ends of these portions 73 are connected in an air-tight manner to boxshaped connecting portions 74 which surround the curved portion of the heating element 78 and which at the same time connect two longer portions 73. The opposite end of each of the longer portions 73 is closed in an airtight manner by means of a cover 79, through which passes the heating element leg together with the electrical connection 28. The edge portions 80 (FIG. 11) of the ribs 29 are connected in an air-tight manner to the tubes 73 and 75, so that the steam can only move helically along the heating element 78. The cross-section of this path, which is limited laterally by adjacent ribs 29, at the top by the outer tube 73 and at the bottom by the inner tube 75, is advantageously less than the cross-section of the feed pipe 7. For example, the cross-section of the feed pipe 7 in the region of the exit from the first heater 5 can be approximately 122 mm$^2$, and the cross-section of the said path can be approximately 83 mm$^2$. The flow conditions in this structure can be influenced even more advantageously if the orifices in the casing 72, to which the sockets 30 and 31 are connected, have an even smaller crosssection, for example 50 mm$^2$. Two adjacent heating elements 78 are connected to one another in flow terms by means of a tubular piece 81.

What is claimed is:

1. A steamer comprising:

container means for receiving food to be treated and having a) steam distribution means therein, b) walls and c) an opening, the steam distribution means having steam inlet means and perforated legs, perforations or orifices of which are substantially adjacent the walls of the container means, said steam distribution means comprising a substantially U-shaped tube having two leg portions connected by a web portion, and wherein said leg portions adjoining ends of said web portion are positioned toward side walls of the container means, said leg portions being bent out of a planar U-shape in opposite directions, extending diagonally along said side walls, and said web portion being positioned toward a rear wall of the container means, door means for closing the opening in said container means, means for generating steam outside of said container means comprising:

(a) first heater means having inlet means and outlet means, (b) means for conducting water from a cold water source to the inlet means, (c) second heater means having inlet means and outlet means, (d) first means for conducting steam from the outlet means of the first heater means to the inlet means of the second heater means, (e) second means for conducting steam from the outlet means of said second heater means to the steam inlet means in the web portion of said steam distribution means, and (f) control means for controlling operation of elements (a) through (e) of said means for generating steam.

2. A steamer of claim 1 wherein said first heater means comprises a substantially cylindrical boiler having a vertically-extending axis and includes elongated electrical heating elements arranged in a lower part of said boiler and a level meter placed above top ends of said heating elements, wherein said meter is attached to the boiler and comprises probe means connected to said control means.

3. A steamer of claim 2 wherein the lower portion of said boiler comprises outlet means, which are openable and closable in a controlled manner, and socket means for introducing means for deliming; said outlet means constituting means for selectively draining water containing limestone mixed with said deliming means from the boiler.

4. A steamer of claim 2 wherein said elongated electrical heating elements comprise substantially U-shaped elements arranged vertically, substantially parallel to one another, lower ends of said heating elements being secured in a lower portion of the boiler, a portion of said lower ends of the heating elements being located outside the boiler for connection with a source of electricity.

5. A steamer of claim 2 wherein a temperature sensor, which extends into said boiler, is fastened to a bottom portion of the boiler and is connected to said control means.

6. A steamer of claim 2 wherein said level meter comprises a substantially U-shaped tube attached to an outside casing of said boiler; said tube comprising two curved portions, each connected at one end to said boiler casing, and tubular means connecting the other ends of said curved portions; said probe means being substantially elongated in shape, having a longitudinal axis substantially parallel to the longitudinal axis of the boiler, and passing through an upper portion of said U-shaped tube.

7. A steamer of claim 1 wherein said second heater means comprises a curved casing and at least one heating element, a first end of said casing being connected to said first steam conducting means and a second end of said casing being connected to said second steam conducting means.

8. A steamer of claim 7 wherein said casing comprises longer parallel portions and shorter parallel portions, said shorter portions comprising connecting channels for said longer portions, a separate heatign element extending through each of said longer portions and fastened in an air-tight manner to end walls of said casing.

9. A steamer as claimed in claim 8 wherein surface portions of each said heating element is provided with a rib portion therearound, said rib portion comprising sheet metal.

10. A steamer of claim 7 wherein said casing contains a plurality of said longer heatingelement-comprising portions positioned parallel to each other, first ends of respective adjacent longer portions being connected in an air-tight manner to a box-shaped connecting portion such that said casing comprises a plurality of U-shaped channels, a second end of each of said longer portions being closed by cover means for maintaining air tightness, said adjacent longer portions of adjacent U-shaped casing channels being connected together by tubular means for enabling flow therebetween attached to said second end of said longer portions; the at least one heating element being U-shaped, and each leg of said at least one heating element being in a respective one of said longer portions of a U-shaped casing channel; a curved portion of said heating element being surrounded by a box-shaped portion of the casing; end portions of the legs of each heating element passing through said cover means; the end portions of the legs being provided with electrical connections.

11. A steamer of claim 10 wherein a rib extends around a surface of each heating element, the rib comprising sheet metal, inner and outer edge portions of said rib being connected in an air-tight manner to an interior side of a wall of a longer portion and to an outer wall of a tube surrounding said heating element, thus constituting means to move steam helically along said heating element.

12. A steamer of claim 1 wherein said door comprises a dish-shaped main part, spacer portions projecting from a bottom portion of said main part, a plate-shaped inner cladding portion resting on free ends of said spacer portions, a flat portion of an all-around bead-shaped seal resting on an edge portion of the cladding, and a frame arranged on the flat portion of the seal, wherein said flat portion of the seal is clamped between said frame and said inner cladding by means of screws.

13. A steamer of claim 1 wherein an outflow pipe is connected to said container means at a lower center portion of a rear wall, wherein said outflow pipe includes an electronically controlled valve and an odor trap.

14. A steamer of claim 1 wherein a longitudinal axis of said steam distribution means forms an angle of about 55 degrees to the horizontal.

15. A steamer of claim 14 wherein free ends of said leg portions are closed, said leg portions comprising a plurality of orifices through which steam flows into the interior of said container means, two rows of said orifices extending along each of said leg portions, a first set of orifices arranged in a peripheral direction of the leg portion enabling steam jets issuing from said orifices to form an angle of less than about 90 degrees with the corresponding side wall, and a second set of orifices arranged in the leg portion in a radial direction enabling steam jets issuing therefrom to form an angle with said side wall, said angle being smaller than the angle of the steam jets issuing from said first orifices.

16. A steamer of claim 14 wherein said web portion is of sufficient length to ensure that elbows at ends of said web portion joining said leg portions are located respectively in floor and ceiling regions of the container means, and wherein said leg portions form an angle of about 58 degrees with a horizontal plane.

17. A steamer of claim 7 wherein said second heater means further comprises temperature sensor means for supplying steam temperature information to said control means.

* * * * *